(12) United States Patent
Ishii et al.

(10) Patent No.: US 9,145,184 B2
(45) Date of Patent: Sep. 29, 2015

(54) FRONT WHEEL SUPPORTING STRUCTURE FOR STRADDLE-TYPE VEHICLE

(71) Applicant: KAWASAKI JUKOGYO KABUSHIKI KAISHA, Hyogo (JP)

(72) Inventors: Hiroshi Ishii, Kobe (JP); Daisuke Saeki, Kakogawa (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 14/104,158

(22) Filed: Dec. 12, 2013

(65) Prior Publication Data

US 2014/0167381 A1 Jun. 19, 2014

(30) Foreign Application Priority Data

Dec. 14, 2012 (JP) ................................. 2012-273473

(51) Int. Cl.
*B62K 25/16* (2006.01)
*B62K 21/00* (2006.01)

(52) U.S. Cl.
CPC ............... *B62K 25/16* (2013.01); *B62K 21/005* (2013.01)

(58) Field of Classification Search
CPC .............................. B62K 25/16; B62K 21/005
USPC .................................. 280/276, 277, 275, 279
See application file for complete search history.

(56) References Cited

U.S. PATENT DOCUMENTS

| 4,533,153 | A | * | 8/1985 | Tsunoda et al. | ............... 280/277 |
| 4,570,963 | A | * | 2/1986 | Isono | ............... 280/277 |
| 8,746,721 | B2 | * | 6/2014 | Thiers | ............... 280/276 |
| 8,783,704 | B2 | * | 7/2014 | Richards | ............... 280/276 |

FOREIGN PATENT DOCUMENTS

| JP | 62-103277 | 5/1987 |
| JP | 63-145187 | 6/1988 |
| JP | 2-189295 | 7/1990 |
| WO | 96/04165 | 2/1996 |

OTHER PUBLICATIONS

European Search Report (ESR) issued Mar. 28, 2014 in corresponding European Patent Application No. EP 13 19 7114.

* cited by examiner

*Primary Examiner* — Kevin Hurley
*Assistant Examiner* — Marlon Arce
(74) *Attorney, Agent, or Firm* — Wenderoth, Lind & Ponack, L.L.P.

(57) ABSTRACT

A front wheel supporting structure for a straddle-type vehicle includes a front arm which supports a front axle and which extends rearward from the front axle to a location behind a front wheel, and a pair of upper and lower link members which are turnably connected to two vertically separated portions of a rear end of a front arm. The link members extend rearward from the rear end of the front arm. Rear ends of the link members are turnably connected to a vehicle body-configuring member. The front wheel supporting structure includes a front suspension mechanism which suppresses turning motion of the front arm.

7 Claims, 6 Drawing Sheets

FRONT WHEEL SUPPORTING STRUCTURE FOR STRADDLE-TYPE VEHICLE

BACKGROUND OF THE INVENTION

1. Field of the Invention

The present invention relates to a front wheel supporting structure for a straddle-type vehicle for supporting a front wheel by a front arm in a swing arm manner.

2. Description of the Prior Art

As described above, as a front wheel supporting structure for a two-wheeled motor vehicle, there is the swing arm manner utilizing a front arm which can swing in the vertical direction.

The front wheel supporting structure in the swing arm manner is disclosed in JP H2 (1990)-189295 A, a pair of upper and lower parallel link members is vertically swingably supported on a vehicle body. The upper and lower link members extend forward to a location close to a front axle, and front ends of the link members support the front axle through a connecting member.

In the conventional swing arm manner, the pair of upper and lower link members extends long in the longitudinal direction, and the front ends of the link members support the front wheel. Therefore, rigidity of an entire link mechanism configured by the upper and lower link members must be increased, and a weight of a front portion of a vehicle is increased.

SUMMARY OF THE INVENTION

The present invention has been accomplished in view of this problem, and it is an object of the invention to provide a front wheel supporting structure for a straddle-type vehicle in which rigidity of a vehicle body member which supports a front arm is suppressed to a low level, and a vehicle can be made lighter in weight.

To solve the above problem, the present invention provides a front wheel supporting structure for a straddle-type vehicle including: a front arm which supports a front axle and which extends rearward from a front axle supporting portion; a pair of upper and lower link members which are turnably (pivotably) connected to two vertically separated portions of a rear end of the front arm at a location rearward of a rear end of the front wheel, and the link members extend rearward in a state where the link members are substantially parallel to each other. The link members have rear ends turnably (pivotably) connected to a vehicle body member (in the form of a link supporting bracket); and a front suspension mechanism is provided which suppresses turning motion of the front arm.

According to this configuration, most of a load (reaction force from road surface) applied to the front wheel at the time of braking can be received by a compression load in a length direction of the front arm, durability can be enhanced, and it is possible to reduce a front dive phenomenon in which a front portion of a vehicle body sinks down. More specifically, the following effects can be obtained.

(1) When the brake is applied, a tire of the front wheel receives a resistance force (reaction force) acting from a road surface rearward with respect to a vehicle body. This resistance force is divided into a force acting in a direction to compress the front arm and a vertical (right angle) force with respect to the front arm. Since the front arm extends in the longitudinal direction, most of the resistance force from the road surface becomes a force acting rearward toward the axis of the front arm (compression direction). Eventually, when the brake is applied, a force acting rearward from front is applied to the vehicle body member which supports the front arm. Therefore, as compared with the conventional structure in which a vertical force is applied when the brake is applied, it is possible to reduce rigidity of the vehicle body portion which supports the front arm, and a weight thereof can be reduced.

(2) The front suspension mechanism suppresses the turning motion of the front arm. Therefore, as compared with a structure in which turning motion of the link member is suppressed, it is possible to reduce a force in a bending direction applied to the link members, and it is possible to lower the rigidity of the link members and to reduce their weights.

(3) Positions where the front arm and the link members are connected to each other are located rearward of the rear end of the front wheel. Therefore, it is possible to dispose the front suspension mechanism for suppressing the turning motion of the front arm at a rear location as rear as possible, and it is possible to move a barycenter toward the centralization. Positions where the front arm and the link members are connected to each other are located rearward of the rear end of the front wheel. Therefore, for steering the front wheel, it is unnecessary to form the link members into curved shapes, and the shapes of the plurality of link members can be simplified into straight shapes.

(4) Most of a resistance force from a road surface acts in an axis direction (e.g. a length direction) of the front arm. Therefore, to prevent the front dive in which a front portion of a vehicle body sinks down, it is unnecessary to increase a spring force and a damper force of the front suspension mechanism. That is, since influence of the front dive is small, it is possible to set the spring force and the damper force especially to enhance ride quality.

In the present invention, it is possible to employ the following configurations in addition to the front wheel supporting structure.

(a) The front suspension mechanism resiliently supports the rear end of the front arm.

According to this configuration, since a load applied to the link member is reduced, it is possible to suppress the rigidity of the link member and to reduce a weight of the vehicle. That is, by resiliently supporting the rear end of the front arm, the main body of the front suspension mechanism can be brought close to a center of the vehicle body, or it is possible to reduce, in size, a buffer mechanism which is disposed on a location extending from the main body of the front suspension mechanism to the front arm, and the front wheel supporting structure can be simplified.

(b) A line connecting the front axle and a turning (pivot) connecting point between the front arm and the upper link member is inclined with respect to a horizontal line.

According to this configuration, the front suspension mechanism can absorb energy generated at the time of collision. For example, if an obstacle collides against the front wheel from the front, the front arm inclines, and a collision force is divided into the direction of the axis (the length direction) of the front arm and a direction intersecting with the direction of the axis at right angles. In this case, the force acting in the direction intersecting with the direction of the axis at right angles is impact-absorbed by the front suspension mechanism, and an impact at the time of collision can be suppressed. The force acting in the direction of the axis is propagated to the vehicle body as a compression load, it is possible to enhance a resistance against an impact as compared with a case where a bending load is generated.

(c) A turning connecting point between the front axle, the front arm and the link member, and a turning connecting point between the link member and the link supporting member is formed into an inverted-V shape or an L-shape.

According to this configuration, like the configuration (b), the front suspension mechanism can effectively absorb energy generated at the time of collision.

(d) A lower one of the link members is disposed on a more inner side in a vehicle-width direction than an upper one of the link members.

According to this configuration, it is possible to reduce leftward and rightward projecting degrees of the lower link members, and to increase a bank angle.

(e) The front suspension mechanism includes a damper member disposed such that it can expand and contract in a vehicle-width direction, and a bell crank member which converts vertical motion of the rear end of the front arm into motion in a vehicle-width direction, and propagates the converted motion to the damper member.

According to this configuration, the damper member which becomes long in the expansion and contraction direction can be disposed compactly as viewed from a side of the vehicle.

(f) Rear ends of the pair of link members are connected to a front end of a vehicle body frame which is provided with a power unit such as an engine and an electric motor.

In short, the present invention provides a front wheel supporting structure for a straddle-type vehicle in which a front arm manner is employed, rigidity of a vehicle body member which supports a front arm is suppressed to a low level, and a vehicle can be made light in weight.

BRIEF DESCRIPTION OF THE DRAWINGS

The above and other objects, features and advantages of the present invention will be become more apparent from the following description taken in connection with the accompanying drawings, in which.

DETAILED DESCRIPTION OF THE PREFERRED EMBODIMENTS

First Embodiment of the Invention

Figure 1:
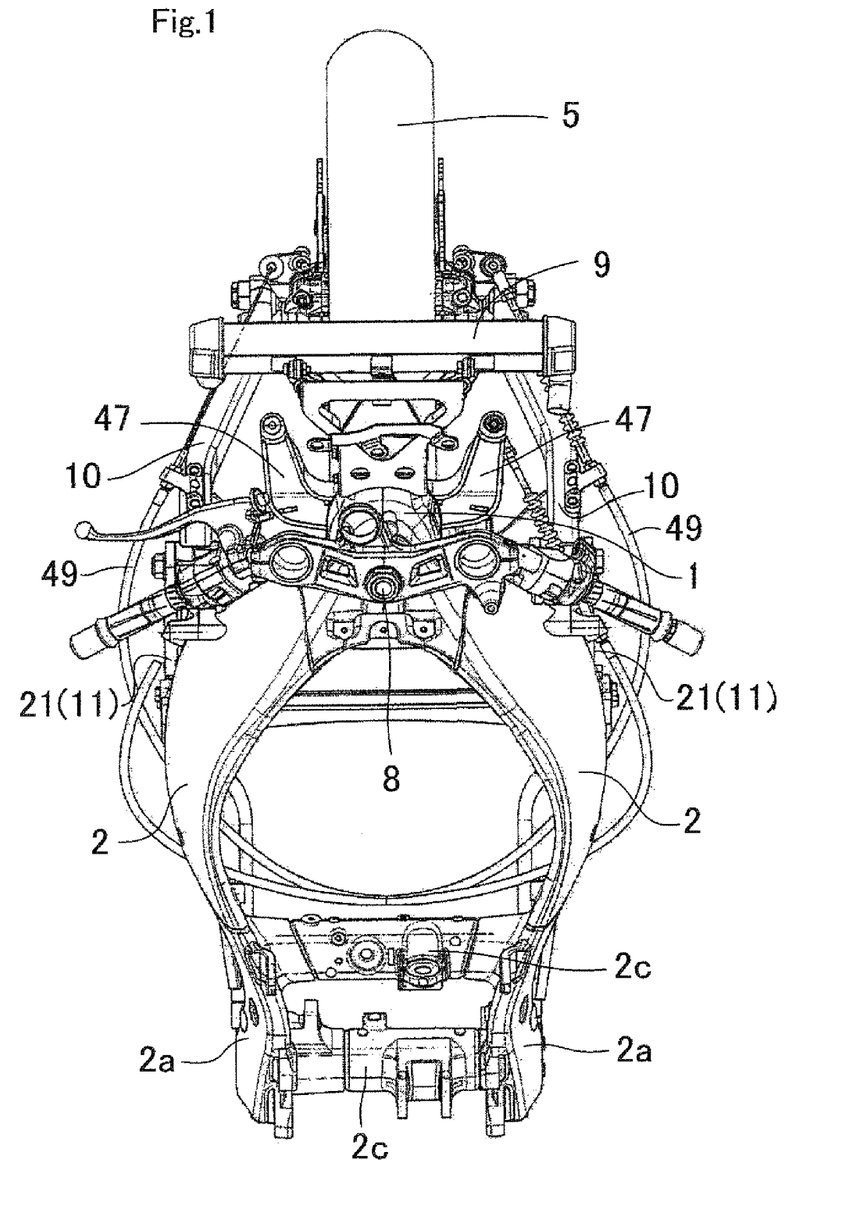
FIG. 1 is a plan view of a two-wheeled motor vehicle according to the present invention.
Figure 2:
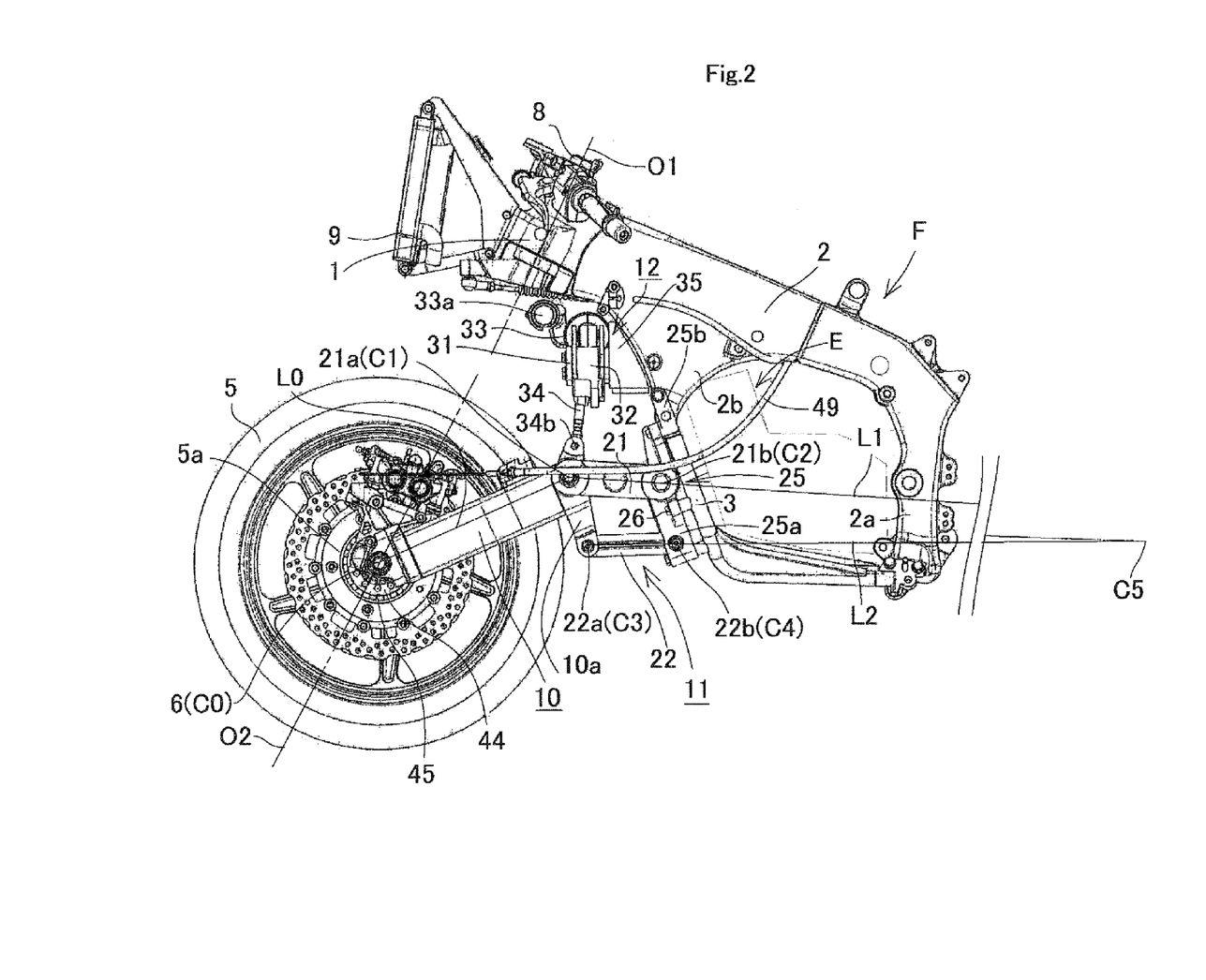
FIG. 2 is a left side view of the two-wheeled motor vehicle in FIG. 1.

FIGS. 1 to 6 show a two-wheeled motor vehicle (a motorcycle) to which the present invention is applied, and an embodiment of the present invention will be described based on these drawings. FIG. 2 is a left side view of the two-wheeled motor vehicle. In FIG. 2, a vehicle body frame F includes a head pipe (head box) 1 which supports a steering shaft 8 connected with handlebars, a pair of left and right main frame members 2, and a pair of left and right down tubes 3. The head pipe 1 supports the handlebars through the steering shaft 8 such that the handlebars can angularly move. Each of the main frame members 2 is a rigid member having a rectangular vertical cross section, and the main frame member 2 is integrally formed together with the head pipe 1 by aluminum casting. The main frame member 2 straightly extends rearward and downward from the head pipe 1. A swing arm bracket 2a is integrally formed on a rear end of the main frame member 2. The swing arm bracket 2a extends downward. A mount portion 2b is formed on a lower surface of a front end of the main frame member 2 such that the mount portion 2b projects downward. The mount portion 2b has an inverted triangular shape as viewed from side of the vehicle. Each of the down tubes 3 is connected to a lower end of the mount portion 2b, and extends substantially downward. A lower end of the down tube 3 is curved rearward, and a rear end of the down tube 3 is couple to a lower end of the swing arm bracket 2a. An internal combustion engine (engine) E is mounted in a space surrounded by the main frame members 2 and the down tubes 3 as a power unit which becomes a running driving source. The internal combustion engine E is supported by the vehicle body frame F. An electric motor may be mounted instead of the internal combustion engine E. A radiator 9 for engine coolant is mounted in front of the head pipe 1.

A front wheel supporting mechanism which supports a front wheel 5 includes a pair of left and right front arms 10 for supporting the front axle 6, parallel link mechanisms 11 composed of a pair of left and right upper link members 21 and a pair of left and right lower link members 22, and a suspension mechanism 12 for the front wheel for suppressing vertical swinging motion of the front wheel 5. A front axle 6 is fixed to a front end of a front arm 10 by bolts 29 (FIG. 3) which extends in the longitudinal direction.

[Configuration of Front Arm 10]

In FIG. 2, the front arm 10 extends substantially rearward and upward from a front axle supporting portion. A rear end 10a of each of the front arms 10 is located rearward of a rear end of the front wheel 5, and bends downward into an L-shape from a main body of the front arm 10. In this embodiment, the rear end 10a is formed as a member which is independent from the main body of the front arm 10 and is fixed to a rear end of the main body of the front arm 10. In the present invention, it is also possible to integrally form the rear end 10a and the main body of the front arm 10 together. No matter which method is employed, in this embodiment, the front arm 10 including the rear end 10a is formed into the L-shape as viewed from the side of the vehicle, and is formed as a rigid member.

The front arm 10 is formed such that an axis L0 of the front arm 10, which connects a core (a center line) C0 of the front axle 6 and a front fulcrum C1 of the upper link member 21 to each other, inclines rearward and upward with respect to a horizontal line. Above the front fulcrum C1 is a connecting point between the rear end 10a of the front arm 10 and the front end of the upper link 21. That is, the main body of the front arm 10 inclines upward as tending rearward, and an angle formed between the axis L0 of the front arm 10 and the horizontal line is set smaller than 45 degrees. The front arm 10 is formed longer than the link members 21 and 22 in the longitudinal direction.

In a plan view of the two-wheeled motor vehicle shown in FIG. 1, the front arm 10 inclines outward in a vehicle-width direction as tending rearward, while taking a steering angle of the front wheel into consideration. More specifically, the front arm 10 includes an inclined portion which inclines outward in the vehicle-width direction as tending rearward, and a parallel portion connected to a rear end of the inclined portion and extending parallel to a plane which extends in the longitudinal direction. The rear parallel portion extends rearward of a rear end of the wheel.

Figure 3:
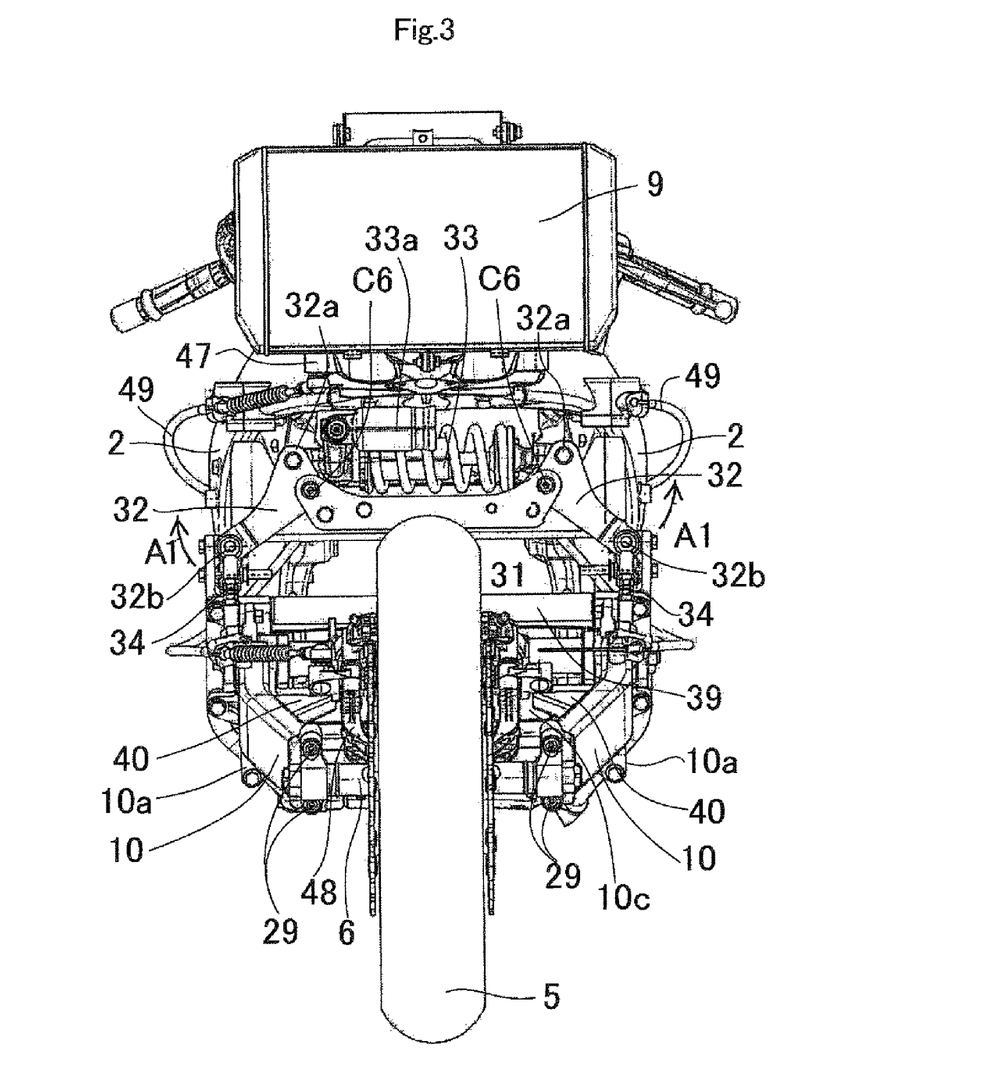
FIG. 3 is a front view of the two-wheeled motor vehicle in FIG. 1.

FIG. 3 is a front view of the two-wheeled motor vehicle. The pair of left and right rear ends 10a of the front arms 10 are connected to each other through a laterally extending cross portion 10c behind the front wheel 5. According to this, rigidity of the front arm 10 is enhanced. Further, a cross section of the front arm 10 is formed into a substantially rectangular shape which is long in the vertical direction, and this configuration further enhances the rigidity. Connected portions between the cross portion 10c and the left and right front arms 10 are integrally provided with triangular reinforcing plates 40. According to this, rigidity of the left and right front arms 10 is further enhanced.

[Configuration of Link Mechanism 11]

In FIG. 2, front ends of the upper link member 21 and the lower link member 22 are connected to the upper and lower ends of each of the rear ends 10a of the front arms 10 through front fulcrum pins 21a and 22a such that the front ends of the link members 21 and 22 can turn around pin axes of the front fulcrum pins 21a and 22a. The upper link member 21 and the lower link member 22 extend rearward substantially parallel to each other from the rear end 10a of the front arm 10. A rear end of the upper link member 21 and a rear end of the lower link member 22 are connected to each of link supporting brackets 25 through rear fulcrum pins 21b and 22b such that the rear ends of the link members 21 and 22 can turn around pin axes of the rear fulcrum pins 21b and 22b. Each of the link supporting brackets 25 is detachably fixed to front surfaces of the down tubes 3 through bolts 26. The pair of left and right parallel link mechanisms 11 extends rearward substantially straightly and parallel to each other in a state where a constant distance is maintained between the link mechanisms 11 in the vehicle-width direction.

A pitch between the front and rear fulcrums C1 and C2 of the upper link member 21 and a pitch between the front and rear fulcrums C3 and C4 of the lower link member 22 are substantially equal to each other, and the upper link member 21 and the lower link member 22 are disposed substantially parallel to each other as described above. Strictly speaking, however, the lower link member 22 is disposed substantially horizontally, but the upper link member 21 is disposed such that a rear portion thereof is slightly lowered. In other words, a pitch in the vertical direction between the rear fulcrum C2 of the upper link member 21 and the rear fulcrum C4 of the lower link member 22 is slightly shorter than a pitch in the vertical direction between the front fulcrum C1 of the upper link member 21 and the front fulcrum C3 of the lower link member 22. According to this, a line L1 connecting the front and rear upper fulcrums C1 and C2 to each other and a line L2 connecting the front and rear lower fulcrums C3 and C4 to each other intersect with each other at a rear intersection point C5. Therefore, the front wheel 5 and the front axle 6 swing in the vertical direction around the intersection point C5 as a fulcrum. A position of the front axle 6 in the vertical direction is substantially the same as heights of the lower fulcrum pins 22a and 22b of the parallel link mechanism 11 in a state where no one rides on the vehicle.

A line (L0-L1) which connects the core C0 of a front axle 6, the front fulcrum C1 of the upper link member 21 and the rear fulcrum C2 of the upper link member 21 to each other has an inverted-V shape. The front arm 10 and the upper and lower link members 21 and 22 are connected to each other such that they can angularly move. Accordingly, the front arm 10 can swing in the vertical direction together with the upper and lower link members 21 and 22.

The upper and lower link members 21 and 22 extend in the longitudinal direction substantially parallel to each other as described above. The upper link member 21 is formed such that its rigidity in a compression direction is greater than that of the lower link member 22. More specifically, a cross section shape of the upper link member 21 which is perpendicular to an axis L1 is greater than a cross section shape of the lower link member 22 which is perpendicular to an axis L2. Further, the upper link member 21 is disposed in a region closer to an extended line of the axis L0 of the front arm 10 than the lower link member 22. The upper link member 21 is formed into such a shape that a resistance force (compression force) from a road surface can sufficiently be propagated from the front arm 10 to the link supporting bracket 25.

Figure 4:
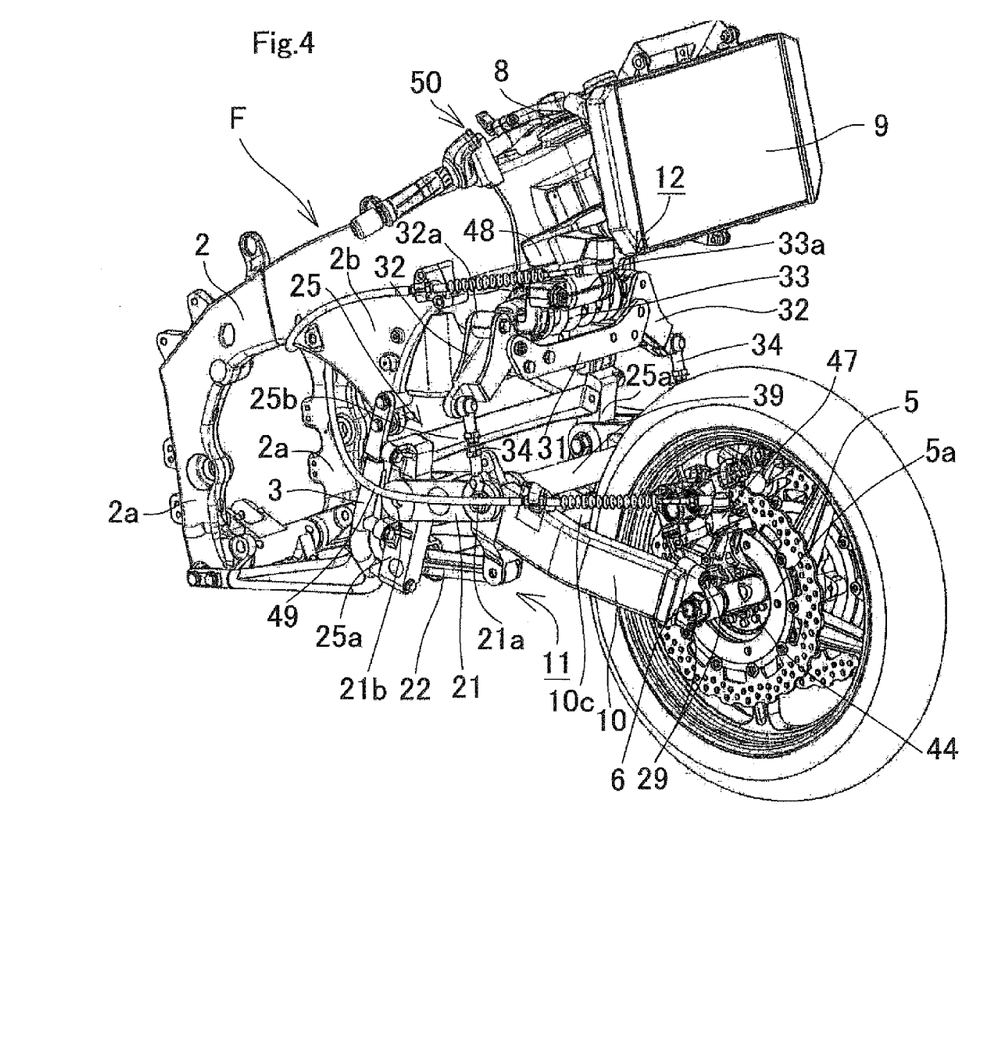
FIG. 4 is a perspective view of the two-wheeled motor vehicle in FIG. 1 as viewed from front and above.

FIG. 4 is a perspective view of the two-wheeled motor vehicle. In FIG. 4, the link supporting brackets 25 include a pair of left and right rail members 25a which extends in the vertical direction and which connects the upper and lower link members 21 and 22 to each other, and a connecting member 25b which extend in the vehicle-width direction and which connects both the rail members 25a to each other. Upper and lower ends of the link supporting bracket 25 are respectively connected to upper and lower ends of the down tubes 3 of the vehicle body frame F.

Structures of the upper and lower link members 21 and 22 and a connecting structure of the front and rear ends of the link members 21 and 22 will be described in detail.

In FIG. 4, a distance between the lower link members 22 of the parallel link mechanism 11 in the vehicle-width direction is shorter than a distance between the upper link members 21 in the vehicle-width direction. In other word, each of the lower link members 22 is located on a more inner side in the vehicle-width direction than each of the upper link members 21.

The upper and lower link members 21 and 22 and the front arm 10 are turnably (pivotably) connected to each other in such a manner that front ends of the upper link members 21 which are formed into U-shapes as viewed from above cover the rear ends of the front arms 10 from both sides in the vehicle-width direction, and the fulcrum pins 21a are inserted into through holes which penetrate the link members 21 and 22 and the front arms 10 in the lateral direction. By covering the front arms 10 with the upper link members 21 from both sides in the vehicle-width direction in this manner, inner side portions of the upper link members 21 located on inner sides of the pair of front arms 10 can be connected to each other through a cross member 39. It is also possible to employ such a configuration that the rear ends of the front arms 10 are formed into U-shapes as viewed from above to cover the both sides of the upper link members 21 in the vehicle-width direction.

Similarly, in this embodiment, the link members 21 and 22 and the link supporting brackets 25 are turnably (pivotably) connected to each other in such a manner that the rear ends of the upper link members 21 which are formed into U-shapes as viewed from above cover upper ends of the link supporting brackets 25 from both sides in the vehicle-width direction, and the pins 21b are inserted into through holes which penetrate the link members 21 and 22 and the link supporting brackets 25 in the lateral direction. Of course, it is also possible to employ such a configuration that the upper ends of the link supporting brackets 25 are formed into U-shapes to cover the both sides of the upper link members 21 in the vehicle-width direction.

Figure 5:
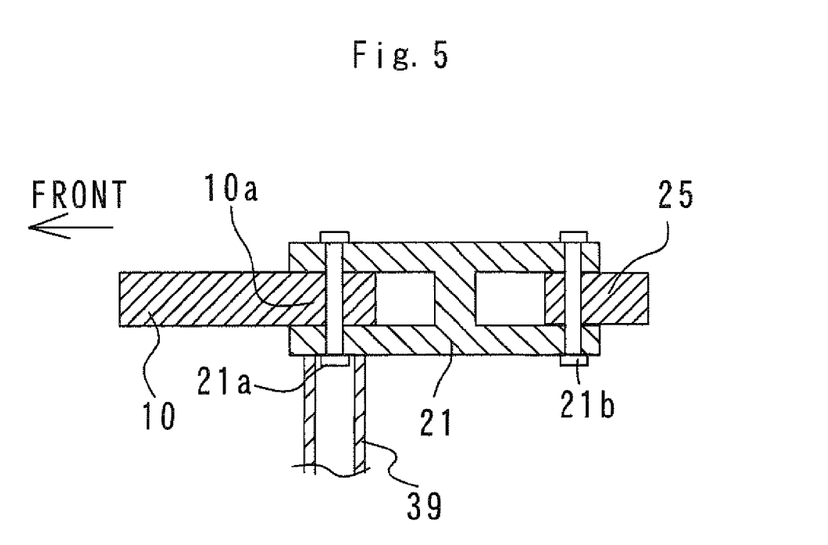
FIG. 5 is an enlarged plan view of an upper link member.

FIG. 5 is a plan view of one of the left and right upper link members 21. The upper link member 21 is formed into an H-shape as viewed from above. As already described above, the bifurcated-shaped front end of each of the upper link members 21 sandwiches the rear end 10a of the front arm 10 from left and right sides, and is turnably (pivotably) coupled to the rear end 10a through the upper front fulcrum pin 21a. Similarly, the bifurcated-shaped rear end of the upper link member 21 sandwiches the link supporting bracket 25 from left and right sides, and is turnably (pivotably) coupled to the link supporting bracket 25 through the upper rear fulcrum pin 21b.

Figure 6:
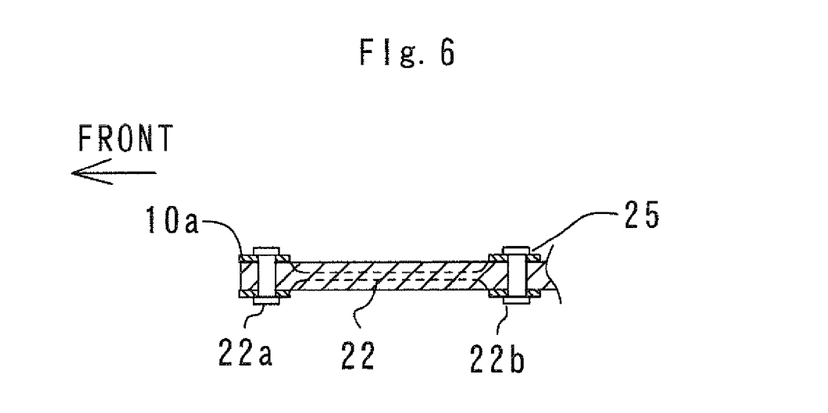
FIG. 6 is an enlarged plan view of a lower link member.

FIG. 6 is a plan view of one of the left and right lower link members 22. The lower link member 22 is formed into an I-shape as viewed from above, and a front end of the lower link member 22 is sandwiched by the bifurcated-shaped rear end 10a of the front arm 10 from left and right sides, and is turnably (pivotably) coupled to the rear end 10a through the lower front fulcrum pin 22a. Similarly, the rear end of the lower link member 22 is sandwiched by the bifurcated-shaped link supporting bracket 25 from left and right sides, and is turnably (pivotably) coupled to the link supporting bracket 25 through the lower rear fulcrum pin 22b.

[Configuration of Suspension Mechanism 12]

In FIG. 4, the suspension mechanism 12 includes a supporting bracket 31 which is fixed to the frame F and which has a U-shaped cross section extending along the vehicle-width direction, a pair of left and right bell crank members (connecting members) 32 which is turnably (pivotably) supported by vehicle-widthwise both ends of the supporting bracket 31, a damper member 33 disposed above the supporting bracket 31 along the vehicle-width direction, and a pair of left and right tie rods 34 which connects lower ends of the bell crank members 32 and upper surfaces of the rear ends 10a of the front arms 10 to each other.

In FIG. 2, in this embodiment, the front arm 10 is disposed such that the line L0 and a line connecting the front fulcrum C1 of the upper link member 21 and a lower end connecting shaft 34b of the tie rod 34 to each other bend (i.e., form an angle). Above the line L0 connects the axis C0 of the front axle 6 and the front fulcrum C1 of the upper link member 21 to each other. The front axle 6, the front fulcrum C1 and the lower end connecting shaft 34b of the tie rod 34 extend in the lateral direction. Therefore, a lever ratio can be adjusted by appropriately setting positions of the shafts and fulcrums.

The supporting bracket 31 is located substantially directly above the rear end 10a of the front arm 10 as viewed from the side of the vehicle. A mounting stage 35 is integrally fixed to a rear surface of the supporting bracket 31. The mounting stage 35 is fixed to a front end of the mount portion 2b of the vehicle body frame F by welding, or detachably fixed thereto through a bolt or the like.

The damper member 33 is a coilover unit formed by combining a coil spring and a hydraulic damper (hydraulic cylinder), and the damper member 33 is disposed substantially directly above the rear end 10a of the front arm 10 together with the supporting bracket 31. More specifically, the damper member 33 is located in a space between an upper surface of the front arm 10 and a lower surface of the head pipe 1, located substantially directly above the rear end 10a of the front arm 10, and located to rearward of the head pipe 1 and the steering shaft 8.

In FIG. 3, a length of the damper member 33 is set to such a value that the damper member 33 falls within a range located on a more inner side in the vehicle-width direction than outer edges of the left and right main frame members 2 in the vehicle-width direction. The damper member 33 is disposed in front of and above an exhaust port and an exhaust pipe of the engine. Accordingly, it is possible to prevent the damper from being heated by heat which is generated in an exhaust system.

Each of the left and right bell crank members 32 includes an upper arm portion 32a which projects upward from a turning fulcrum C6, and a lower arm portion 32b which projects obliquely downward. The bell crank member 32 is supported such that it can angularly move around the turning fulcrum C6. An output shaft is set on an upper end of the upper arm portion 32a. The upper arm portion 32a is connected to operating portions on both ends of the damper member 33 such that the upper arm portion 32a can angularly move around the output shaft. An input shaft is set on the lower arm portion 32b. The lower arm portion 32b is connected to an upper end of the tie rod 34 such that the lower arm portion 32b can angularly move around the input shaft.

In this embodiment, each of the bell crank members 32 is formed, as its name suggests, such that a line which connects the output shaft of the upper arm portion 32a and the turning fulcrum C6 to each other, and a line which connects the input shaft of the lower arm portion 32b and the turning fulcrum C6 to each other bend. The turning fulcrum C6, the lower input shaft and the upper output shaft extend in the longitudinal direction.

The damper member 33 is resiliently expanded and contracted in the vehicle-width direction (length direction of the damper member) by turning motion of both the bell crank members 32 around the fulcrum C6. It is possible to adjust a lever ratio which is a variation ratio of an input end of the damper member 33 with respect to displacement of the front arm 10 by appropriately setting positions of the turning fulcrum C6 of the bell crank member 32, the output shafts and the input shafts of the upper and lower arm portions 32a and 32b.

An input-side lower end (input shaft) of each of the bell crank members 32 is located on a more outer side in the vehicle-width direction than the turning fulcrum C6 of the bell crank member 32, and located on a more outer side than the end of the damper member 33 in the vehicle-width direction.

In FIG. 4, the output-side upper arm portion 32a of the bell crank member 32 is composed of bifurcated-shaped wall portions, and the upper arm portion 32a is connected to the damper member 33 in a state where ends of the damper member 33 in the vehicle-width direction is sandwiched between the bifurcated-shaped wall portions.

A reserve tank 33a is located on a front side of the damper member 33 and above this front side, disposed substantially parallel to the damper member 33, and mounted on a main body of the damper member 33.

An upper end of each of the tie rods 34 is turnably connected to a lower end of the bell crank member 32 through a ball joint (pillow ball), and a lower end of the tie rod 34 is turnably connected to an upper surface of the rear end 10a of the front arm 10 through a ball joint. That is, as shown in FIG. 2, the tie rod 34 is connected to the rear end 10a of the front arm 10 such that the tie rod 34 can angularly move around a core of a connecting shaft 34b which extends in the vehicle-width direction.

Both the tie rods 34 are disposed substantially perpendicular to a horizontal plane. Lengths of the tie rods 34 can individually be adjusted by screw structures like so-called turn buckles.

In this embodiment, directions (vehicle-width directions) of the rear end 10a of the front arm 10 and the lower end of the tie rod 34, and a direction (longitudinal direction) of the input shaft of the lower arm portion 32b of the bell crank member 32 are different from each other, and their moving directions are also different from each other. Therefore, the upper and lower ends of the tie rod 34 are connected to both the front arm 10 and the bell crank member 32 through the ball joints. Accordingly, power can be transmitted as described above.

A steering mechanism will be described below. In FIG. 4, the front wheel 5 is rotatably supported by a so-called hub-steering mechanism such that the front wheel 5 can be steered laterally with respect to the front axle 6. Although a general hub-steering mechanism is known, this mechanism will be described briefly below. In FIG. 2, a wheel-side steering shaft (not shown) is fixed to the front axle 6. The wheel-side steering shaft is perpendicular to the front axle 6 at right angles. The wheel-side steering shaft has a core O2 which is substantially parallel to a core O1 of the handlebars-side steering shaft 8 or matches with the core O1. A hub supporting cylinder shaft 44 is supported by the wheel-side steering shaft such that the hub supporting cylinder shaft 44 can be steered laterally, and a hub 5a of the front wheel 5 is rotatably supported by an outer periphery of the hub supporting cylinder shaft 44 through a bearing 45. That is, the front wheel 5 can be steered laterally together with the hub supporting cylinder shaft 44 with respect to the front axle 6, and the front wheel 5 rotates with respect to the hub supporting cylinder shaft 44.

In FIG. 4, wire connecting portions 47 for steering are provided on left and right ends of the hub supporting cylinder shaft 44. A steering wire 49 is attached between the wire connecting portions 47 and a handlebars-side bracket 48 which is laterally steered integrally with the handlebars-side steering shaft 8. That is, the hub supporting cylinder shaft 44 and the front wheel 5 are laterally steered through the steering wire 49 by a lateral steering operation of the handlebars 50. In FIG. 2, a connecting structure of an end of the steering wire 49 on the side of the wheel is omitted.

An operation will be described. In FIG. 2, when the vehicle runs on a bumpy road, the front wheel 5, the front axle 6 and the front arm 10 vertically swing together with vertical swing of the front end of the parallel link mechanism 11. More specifically, the intersection point C5 between the straight line L1 connecting the front and rear fulcrums C1 and C2 of the upper link member 21 to each other and the straight line L2 connecting the front and rear fulcrums C3 and C4 of the lower link member 22 to each other becomes a center of swinging motion, and the front wheel 5 and the front end of the front arm 10 vertically swing.

In FIG. 3, the vertical swing of the front wheel 5 is propagated from the rear ends 10a of the left and right front arms 10 to the left and right bell crank members 32 through the left and right tie rods 34. The bell crank members 32 turns around the fulcrum C6 in a direction of arrow A1, thereby compressing the damper member 33 in the vehicle-width direction, and this suppresses the vertical swing of the front wheel 5.

In FIG. 2, when the brake is applied, a resistance force (reaction force) is applied rearward from a road surface to the front wheel 5. Most of the road surface resistance force at the time of braking is applied to the front arm 10 as a compression load in a length direction (substantially longitudinal direction) of the front arm 10, and the road surface resistance force is propagated from the front arm 10 to the vehicle body frame F through the parallel link mechanism 11. The vehicle body frame F receives the road surface resistance force as a load in the substantially longitudinal direction. Therefore, a large front dive phenomenon which may be caused at the time of braking is not generated unlike a front fork manner.

A force relation applied to the front arm 10 and the like at the time of braking will be described below in detail. In FIG. 2, in reality, the road surface resistance force can be divided into a component force which is applied rearward in parallel with a line connecting the core C0 of the front axle 6 and the rear virtual intersection point C5 to each other, and a component force to push up or down the front arm 10 with respect to the vehicle body frame F. When the virtual intersection point C5 is set higher than a road surface, this upward or downward component force becomes a force to push down the front arm 10. That is, this force becomes a component force to move the front arm 10 in a direction separating away from the head pipe 1. Since most of the resistance force from a road surface becomes a component force which is applied, in parallel, to a line connecting the core C0 of the front axle 6 and the virtual intersection point C5 to each other, this component force is received by the front arm 10 as a compression force applied along the axis L0 and is eventually received as a rearward force applied to the vehicle body frame F. Accordingly, front dive is suppressed.

When the brake is applied, an inertia force is applied to the vehicle body frame F in addition to the road surface resistance force, this inertia force acts as a force to make the vehicle body frame F approach toward the front wheel 5, but since the virtual intersection point C5 is set higher than a road surface, the inertia force is attenuated (canceled) by a component force of the road surface resistance force which tries to push down the front wheel 5. According to this, the front dive phenomenon of the vehicle body frame F caused by the inertia force is suppressed.

Various adjusting operations will be described. It is possible to adjust a height of the two-wheeled motor vehicle by simultaneously adjusting lengths of the left and right tie rods 34. It is possible to correct lateral inclination of the front wheel 5 by individually adjusting lengths of the left and right tie rods 34.

Since influence of front dive is small, it is unnecessary to increase a spring force and a damper force of the suspension mechanism 12 more than necessary to prevent front dive, and it is possible to set characteristics of a suspension mechanism to conform ride quality.

It is possible to appropriately change a lever ratio in the bell crank members 32 by changing various connecting positions in the bell crank members.

Effects of the Embodiments (1) In FIG. 2, when the brake is applied, a tire of the front wheel 5 receives a resistance force (reaction force) acting from a road surface rearward with respect to a vehicle body. This resistance force is divided into a component force to compress the front arm 10 in the direction of the axis L0 and a substantially vertical component force to move the front arm 10 downward, as described above. In this embodiment, since the front arm 10 extends substantially in the longitudinal direction, most of the resistance force from a road surface becomes a component force acting rearward toward the axis L0 of the front arm 10 and eventually, when the brake is applied, a force acting rearward from front is applied to the vehicle body frame F. Therefore, as compared with the conventional front fork structure in which most of a resistance force from a road surface is applied in the vertical direction when the brake is applied, it is possible to reduce rigidity of the vehicle body frame F which eventually supports the front arm 10, and a weight of the vehicle body frame F can be reduced.

(2) The front suspension mechanism 12 suppresses the turning motion of the front arm 10. Therefore, as compared with a structure in which turning motion of the link member is suppressed, it is possible to reduce a force in a bending direction applied to the link members 21 and 22, and it is possible to lower the rigidity of the link members 21 and 22 and to reduce their weights.

(3) Positions where the front arm 10 and the link members 21 and 22 are connected to each other are located rearward of the rear end of the front wheel 5. Therefore, it is possible to rearwardly deviate a position of the front suspension mechanism 12 for suppressing the turning motion of the front arm 10 as much as possible, and it is possible to move a barycenter toward the centralization. Positions where the front arm 10 and the link members 21 and 22 are connected to each other are located rearward of the rear end of the front wheel 5. Therefore, for steering the front wheel, it is unnecessary to form the link members 21 and 22 into curved shapes, and the shapes of the plurality of link members 21 and 22 can be simplified into straight shapes.

(4) Most of a resistance force from a road surface acts toward the axis L0 of the front arm 10. Therefore, to prevent the front dive in which a front portion of a vehicle body sinks down, it is unnecessary to increase the spring force and the damper force of the front suspension mechanism 12. That is, influence of the front dive is small, and it is possible to set the spring force and the damper force especially to enhance ride quality.

(5) Since the front suspension mechanism 12 resiliently supports the rear end of the front arm 10, loads applied to the link members 21 and 22 are reduced, rigidity of the link members 21 and 22 is suppressed, and the vehicle can be made lighter in weight. That is, by resiliently supporting the rear end of the front arm 10, it is possible to bring the main body of the front suspension mechanism 12 close to a center of the vehicle body, or it is possible to reduce, in size, a buffer mechanism which is disposed on a location extending from the main body of the front suspension mechanism 12 to the front arm 10, and the front wheel supporting structure can be simplified.

(6) The axis L0 connecting the core C0 of the front axle 6 and a turning connecting point C1 between the front arm 10 and the upper link member 21 inclines such that the axis L0 projects upward with respect to the horizontal line. Therefore, the front suspension mechanism 12 can absorb energy generated at the time of collision. For example, if an obstacle collides against the front wheel 5 from the front, the front arm 10 inclines, and a collision force is divided into a direction of the axis L0 of the front arm 10 and a direction intersecting with the direction of the axis at right angles. In this case, a force acting in a direction intersecting with the direction of the axis at right angles is impact-absorbed by the front suspension mechanism 12, and an impact at the time of collision can be suppressed. A force acting in the direction of the axis L0 is propagated to the vehicle body as a compression load, and it is possible to enhance a resistance against an impact as compared with a case where a bending load is generated.

(7) The pair of left and right lower link members 22 is disposed on a more inner side in the vehicle-width direction than the pair of left and right upper link members 21. Therefore, it is possible to reduce leftward and rightward projecting degrees of the lower link members 22, and to increase a bank angle.

(8) Since the tie rod 34 of the front suspension mechanism 12 is connected to the rear end 10a of the front arm 10, the front suspension mechanism 12 can absorb vertical swinging motion of the front wheel 5 without through the parallel link mechanism 11. Accordingly, a large load is not applied to the parallel link mechanism 11 in the vertical direction, and the link members 21 and 22 can be made lighter in weight.

(9) The front suspension mechanism 12 includes the damper member 33 which is disposed such that it can expand and contract in the vehicle-width direction, the bell crank member 32 which converts vertical motion of the rear end 10a of the front arm 10 into motion in the vehicle-width direction and which propagates the converted motion to the damper member 33. Therefore, the damper member 33 which becomes long in the expansion and contraction direction can be disposed compactly as viewed from the side of the vehicle.

(10) The two front arms 10 and the two pairs of link members 21 and 22 are disposed on both the left and right sides of the front wheel 5. Therefore, rigidity for supporting the front axle is enhanced, and it is possible to uniformly receive, from left and right sides, a resistance force applied from a rear surface to the front wheel 5 at the time of braking, and to prevent lateral deflection of the vehicle body.

(11) The left upper link member 21 and the right upper link member 21 are connected to each other through the cross member 39 which extends in the vehicle-width direction. Therefore, rigidity can be enhanced, and the left and right sides can go through the same motion.

(13) Since the upper link member 21 and the front suspension mechanism 12 are connected to each other at a portion where the cross member 39 is disposed, it is possible to prevent rigidity from being deteriorated.

(14) Since the front suspension mechanism 12 is disposed at a location higher than the upper link member 21, it is possible to prevent the upper link member 21 and the front suspension mechanism 12 from interfering with each other.

(15) The link members 21 and 22 are connected to the vehicle body using the link supporting bracket 25 which is the member which is independent from the vehicle body frame F. Therefore, it is possible to prevent flexibility in design of the vehicle body frame F from being deteriorated.

(16) The link supporting brackets 25 abut against and are fixed to the down tubes 3 of the vehicle body frame F by the bolts 26, and axes of the bolts 26 extend in the longitudinal direction. Therefore, rigidity when a compression force is applied can be enhanced.

(17) Since the front ends of the front arms 10 and the front axle 6 are fixed from front by the bolts 29 (FIG. 3) extending in the longitudinal direction, rigidity when a compression force is applied can be enhanced.

(18) It is unnecessary that the head pipe 1 supports the front wheel 5 or acts against a reaction force from a road surface. Therefore, rigidity of the head pipe 1 may be low, and the head pipe 1 can be made lighter in weight.

(19) The tie rod 34 connected to the front suspension mechanism 12 is formed above a position where the front arm 10 and the upper link member 21 are connected to each other, and the tie rod 34 projects upward from the main body of the front arm 10. That is, since the tie rod 34 projects upward, the tie rod 34 of the front suspension mechanism 12 can be shortened in length.

(20) Since the tie rods 34 are provided in the vicinity of the cross member 39 which connects the upper link members 21 to each other, it is possible to suppress vertical fluctuation at the left and right tie rods 34. Further, since the tie rods 34 are located to rearward of the rear end of the front wheel, it is possible to suppress the displacement of the front arm 10 and to prevent the front suspension mechanism 12 from becoming large in size.

(21) The rear ends of the pair of left and right front arms 10 are connected to each other through the cross portion 10c, it is possible to enhance the rigidity of the front arms 10.

Figure 7:
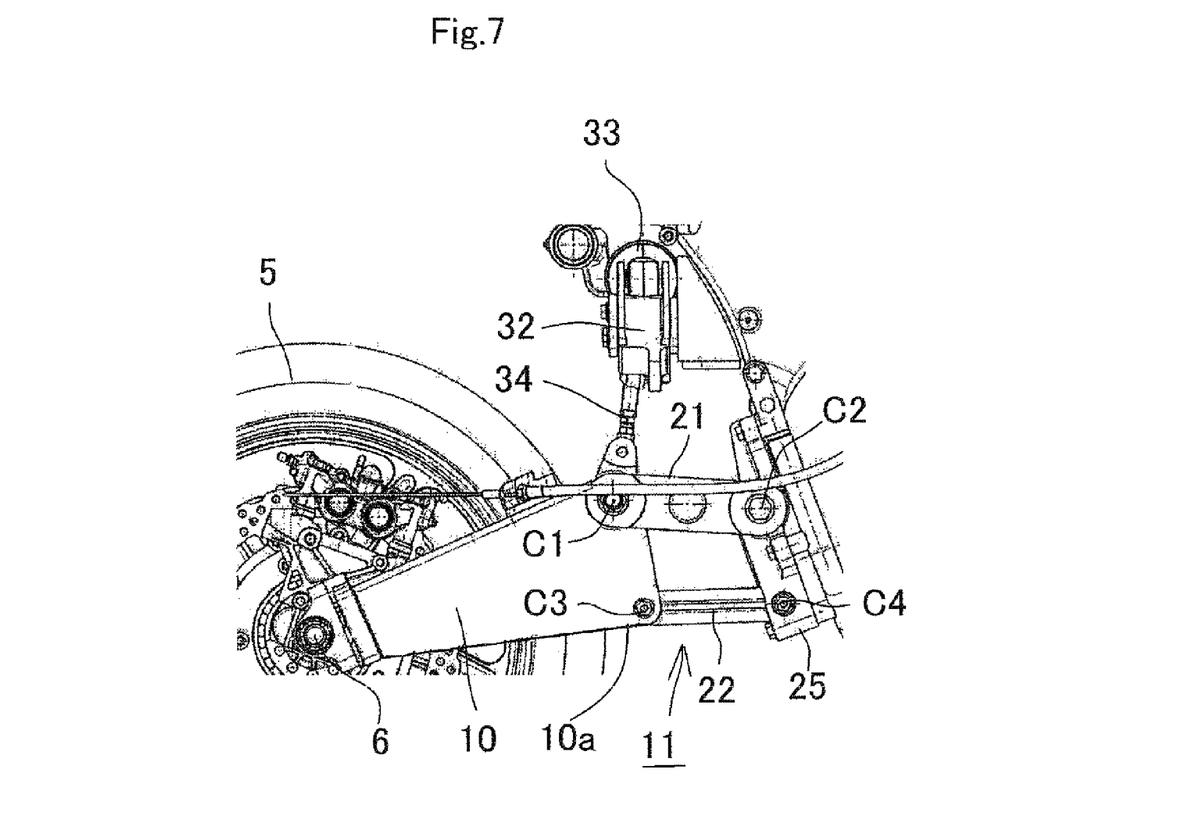
FIG. 7 is a side view of a first modification of a front arm.

OTHER EMBODIMENTS (1) FIG. 7 shows a modification of the front arm 10. The front arm 10 is formed such that a width thereof in the vertical direction becomes wider rearward as viewed from the side of the vehicle, and front ends of upper and lower link members 21 and 22 are turnably connected to a wide rear end 10a. As another modification, the rear end 10a of the front arm 10 may be formed into a T-shape projecting in the vertical direction as viewed from the side of the vehicle.

(2) As another modification, the rear end 10a of the front arm 10 can be formed into an L-shape extending upward as viewed from the side of the vehicle.

(3) Although the damper member 33 of the front suspension mechanism 12 is disposed such that it expands and contracts along the vehicle-width direction in the embodiment, the damper member 33 can be disposed along the longitudinal direction or can be disposed such that the damper member 33 becomes higher rearward.

(4) Although the parallel link mechanism 11 is mounted on the down tube 3 of the vehicle body frame F in the embodiment, the rear end of the parallel link mechanism 11 may be supported directly by a front end of the engine which is supported by the vehicle body frame F.

(5) The present invention is not limited to a vehicle having a steering apparatus utilizing a steering wire. For example, it is possible to employ such a structure that a handlebars-side steering shaft and a wheel-side steering shaft are connected to each other through a link mechanism which can be folded in the vertical direction. It is also possible to employ other structures. More specifically, a force required for cornering is transmitted from the handlebars to the hub supporting cylinder shaft through a link mechanism which is composed of a plurality of link members connected to a steering shaft such that the link members can angularly move from the steering shaft.

(6) A turning connecting point between the front arm and the link mechanism may be formed such that the point is lowered rearward with respect to the horizontal line. Further, a line which connects the front axle, a front turning connecting point and a rear turning connecting point to one another may be formed into an inverted-V shape.

(7) The link supporting bracket which supports the link members may be fixed to a case of a power unit such as an engine. According to this, rigidity of a link connecting portion in the power unit case need not be excessively strong, and flexibility in design can be enhanced.

(8) The rear end of the front arm can be folded upward with respect to the main body of the front arm.

(9) It is not always necessary that the upper and lower link members of the link mechanism are parallel to each other.

(10) Although the pair of left and right front arms and the link members are provided in the embodiment, it is possible to employ such a structure that the front arm and the link member are provided only on one of the left and right sides.

(11) It is not always necessary that the core O1 of the handlebars-side steering shaft 8 and the core O2 of the wheel-side steering shaft match with each other. In this case, front side peripheries can neatly be simplified, and the head pipe 1 can be made lighter in weight.

(12) The present invention is not limited to the two-wheeled motor vehicle, and the invention can be applied also to a straddle-type three-wheeled vehicle and a straddle-type four-wheeled vehicle.

What is claimed is:

1. A front wheel supporting structure for a straddle-type vehicle comprising:
    a front arm for supporting a front axle, the front arm extending rearward from a front axle supporting portion;
    a pair of upper and lower link members pivotably connected to two vertically separated portions of a rear end of the front arm at a location rearward of a rear end of a front wheel, the pair of upper and lower link members extending rearward from the rear end of the front arm and substantially parallel to each other, and each having a respective rear end pivotably connected to a link supporting bracket; and
    a front suspension mechanism for suppressing turning motion of the front arm.

2. The front wheel supporting structure for a straddle-type vehicle according to claim 1, wherein
    the front suspension mechanism resiliently supports the rear end of the front arm.

3. The front wheel supporting structure for a straddle-type vehicle according to claim 2, wherein
    a line connecting the front axle and a pivot connecting point between the front arm and the upper link member is inclined with respect to a horizontal line.

4. The front wheel supporting structure for a straddle-type vehicle according to claim 1, wherein
    a line connecting a pivot connecting point between the front axle and the front arm, a pivot connecting point between the upper link member and the rear end of the front arm, and a pivot connecting point between the upper link member and the link supporting bracket has an inverted-V shape.

5. The front wheel supporting structure for a straddle-type vehicle according to claim 1, wherein
    the lower link member is disposed further inwardly in a vehicle-width direction than the upper link member.

6. The front wheel supporting structure for a straddle-type vehicle according to claim 1, wherein
    the front suspension mechanism includes a damper member configured to expand and contract in a vehicle-width direction, and a bell crank member configured to convert vertical motion of the rear end of the front arm into motion in a vehicle-width direction, and configured to propagate the converted motion to the damper member.

7. The front wheel supporting structure for a straddle-type vehicle according to claim 1, wherein
    each respective rear end of the pair of upper and lower link members is connected to a front end of a vehicle body frame having a power unit.

* * * * *